UNITED STATES PATENT OFFICE.

KARL FISCHER, OF SCHWEINFURT, GERMANY.

INSECTICIDE FOR PLANTS AND PROCESS OF MAKING THE SAME.

1,085,898.　　　　Specification of Letters Patent.　　Patented Feb. 3, 1914.

No Drawing.　　Application filed August 11, 1913. Serial No. 784,253.

*To all whom it may concern:*

Be it known that I, KARL FISCHER, manufacturer, a subject of the Kingdom of Bavaria, in the German Empire, residing at 16 Cramerstrasse, Schweinfurt-on-the-Main, Germany, have invented certain new and useful Improvements in Insecticides for Plants and Processes of Making the Same, of which the following is a specification.

The subject-matter of my invention is an insecticide for plants and a process of making the same, the highly poisonous Schweinfurt green or similarly acting copper-arsenic compounds being employed.

Schweinfurt green which is insoluble in water has already been employed as an insecticide, for which purpose it must be suspended in water. Owing to its specific gravity it quickly settles at the bottom and consequently requires to be continually stirred in order to sprinkle the plants with a uniform layer of the suspended solid, and even then the said green in such a layer is not distributed finely enough to obtain the desired effect. Schweinfurt green would intensively and uniformly act upon the insects if it were employed in the form of a suitable solution. It is known that Schweinfurt green, which is insoluble in water, dissolves in ammonia and in solutions of ammonia salts, *i. e.*, such as have an excess of free ammonia, whereas it is insoluble in neutral ammoniacal solutions. Accordingly, the solution of the Schweinfurt green depends upon the presence of free ammonia. Such ammoniacal solutions of Schweinfurt green are, however, unsuitable as an insecticide for plants, because owing to the considerable quantity of free ammonia they act detrimentally or destructively on the plants themselves. Moreover the ammonium copper compound obtained by dissolving Schweinfurt green in ammonia cannot be converted into a solid form. It exists only in the presence of an excess of ammonia and decomposes when evaporated at ordinary temperatures or when poured into water, Schweinfurt green being precipitated. A solution of Schweinfurt green in acids is out of the question, because not only does complete decomposition occur, but acids are unsuitable for the present purpose.

It is known that the trisulfid and other compounds of arsenic dissolve in ammonia and in carbonate of ammonia. Apart from the fact, however, that in the case of Schweinfurt green it is not a question of a salt of arsenic, but of a salt of copper, namely a copper double salt of arsenious acid, and acetic acid, it must be kept in view when preparing an insecticide for plants that it requires to be put on the market in a readily employable form. The small farmer, gardener, vine-dresser or garden-owner cannot be expected to procure separately the various constituents, Schweinfurt green, ammonia, carbonate of ammonia and so on, and himself prepare the insecticide therefrom according to a recipe supplied to him. Moreover, simply mixing Schweinfurt green with carbonate of ammonia and dissolving the mixture in water would not yield the new product and would not produce the desired effect. It is necessary to put the insecticide on the market in such a form that it can be used in the simplest manner and by employing only water.

A primary object of my invention is to obviate all the defects which have hitherto become apparent when employing Schweinfurt green, which *per se* is very suitable as an insecticide. To this end, I intimately mix Schweinfurt green with a salt of ammonia, which can be dissociated at an ordinary temperature, *e. g.* ammonium carbonate, ammonium acetate, ammonium formiate, ammonium borate, cyanid of ammonium and the like, and apply heat until the intense green color of the mixture becomes converted to blue. During this process dissociation of the ammonium salt and separation of ammonia occurs, the latter being immediately absorbed by the adjacent fine particles of the green and so forming a solid ammonium copper compound. The degree of heat necessary varies somewhat with the particular salt of ammonia used, but must necessarily be such as to cause dissociation of the ammonia salt with consequent production of nascent ammonia. The mixture may suitably have the following proportions:—1 part Schweinfurt green and 4 parts ammonium carbonate; a useful product is, however, obtained with smaller or larger quantities of ammonium carbonate.

The preparation obtained by chemical conversion according to the above-described process readily dissolves in water; the deep blue solution is stable and forms an excellent insecticide for plants without danger either to the plants themselves or to men and beasts. The solid preparation keeps very well in closed vessels and can accordingly be readily despatched to all parts.

The excellent action of the aqueous solution of the preparation is attributable to the fact that when sprayed into the air a decomposition speedily occurs, insoluble Schweinfurt green being separated which is not absorbed by the plant. The green however is so remarkably finely distributed that it acts as an infallible insecticide for the plant.

It has been found that when rose trees have been twice sprinkled with the solution caterpillars are immediately killed and that such insects as *Schizoneura lanigera*, *Conchylis roserana* and *Conchylis ambiguella* can be dealt with with equal success.

I claim—

1. The process of making an insecticide which consists in heating Schweinfurt green in the presence of a dissociable salt of ammonia until the mixture has a blue color, and in dissolving the product thereby obtained in water.

2. In the process of making an insecticide, the step of heating Schweinfurt green in the presence of a dissociable salt of ammonia until the mixture has a blue color.

3. A process of making an insecticide, consisting in mixing together and simultaneously heating Schweinfurt green and ammonium carbonate until the mixture has a blue color, and in dissolving the product thereby obtained in water.

4. An insecticide consisting of an ammonium copper arsenic compound, the same having a blue color in solid form and giving a blue solution with water.

In testimony whereof I have hereunto set my hand in presence of two subscribing witnesses.

KARL FISCHER.

Witnesses:
 HENRY HASPER,
 HARRY L. WILSON.